Dec. 24, 1957 L. A. MEDLAR 2,817,816
SUPPRESSED ZERO METERS
Filed April 22, 1952

FIG. 3ᵃ

INVENTOR
LEWIS A. MEDLAR
BY
Stone, Boyden & Mack,
ATTORNEYS

2,817,816

SUPPRESSED ZERO METERS

Lewis A. Medlar, Oreland, Pa., assignor, by mesne assignments, to Fox Products Company, Philadelphia, Pa., a corporation of Pennsylvania Application April 22, 1952, Serial No. 283,644

4 Claims. (Cl. 324—131)

This invention relates to electrical meters and particularly to such meters known in the art as suppressed zero meters.

An electrical meter is said to be of the suppressed zero type when the meter gives no indication until the quantity being measured exceeds a predetermined value above true zero.

Numerous mechanical and electromagnetic schemes have been proposed for obtaining zero suppression in an electrical meter. The mechanical suppressing means employed usually involve a restraining hair spring connected to the moving system of the meter to oppose the deflecting force. The use of a hair spring as a suppressing element is often undesirable because the strength of the hair spring changes with age and because the amount of suppression attainable with a spring is rather limited. While the electromagnetic suppressing systems are often advantageous, they are usually relatively expensive and, with certain exceptions, are limited to alternating current meters. There has long been a need for a simple and inexpensive suppressed zero meter capable of direct current operation with relatively large amounts of suppression.

An object of the present invention is to provide such a suppressed zero meter wherein the use of hair springs, complicated electromagnetic arrangements, and the like are avoided.

A further object of the invention is to provide for large amounts of zero suppression without necessitating extensive modification of the basic structure of the meter.

Yet another object is to provide, in a direct current meter, zero suppressing means which lends itself to simple adjustment for initial calibration of the meter.

The present invention is applicable to so-called moving magnet meters, such as that shown in Patent 2,446,431 to Pfeffer. In such meters, the moving system comprises a rotary magnet, which is magnetized transversely of its axis of rotation. For example, the rotary magnet may be a disc which is diametrically magnetized. A single deflecting or driving coil is usually employed, and the magnet is disposed adjacent one end of the coil with its axis of rotation at right angles to the coil axis, so that energization of the coil results in a deflecting torque on the magnet, tending to deflect the indicating means of the meter upscale when current flow in the coil is in one direction. For especially high degrees of suppression, where more ampere-turns are required, two deflecting coils may be used.

According to the invention, zero suppression in such a meter is obtained by incorporating in the meter a body of magnetic material, hereinafter referred to as a suppressing member, in such a manner that the magnetic effect of the suppressing member on the rotary magnet opposes the magnetic effect of the driving coil when the rotary magnet is in its initial position and current flow in the coil is in a direction such that the field of the coil tends to cause an upscale deflection of the indicating means of the meter. The suppressing member may be a permanent magnet arranged with its dipole axis extending transversely of the axis of rotation of the rotary magnet. Alternatively, the suppressing member may be a body of ferromagnetic material, since the rotary magnet is capable of inducing poles therein; and in this event the suppressing member is positioned adjacent the rotary magnet in such a manner that the axis of the induced dipole extends transversely of the axis of rotation of the rotary magnet.

In order that the invention may be understood in detail, reference is had to the accompanying drawings which form a part of this specification and wherein:

Fig. 3a is a diagram similar to Fig. 3 for a modified form of the meter of Fig. 1;

Fig. 4 is a diagram showing the relationship of torque to deflection in a meter embodying the invention when the magnetic relationships are as illustrated in Fig. 3 or 3a;

Figure 1:
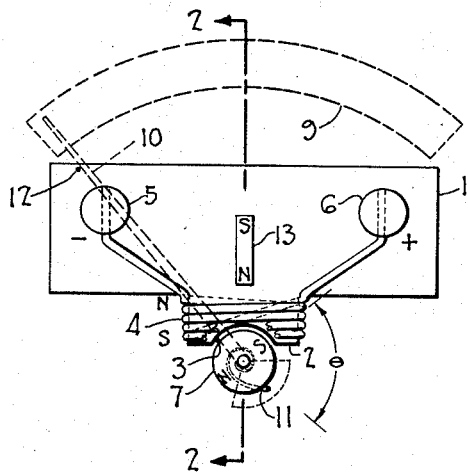
Fig. 1 is an elevational view of one meter structure embodying the invention.
Figure 2:
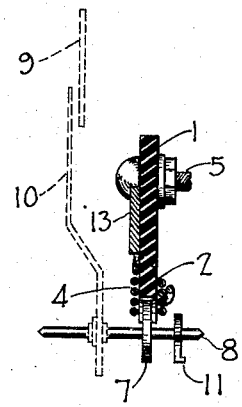
Fig. 2 is a sectional view taken on the line 2—2, Fig. 1, with some parts shown in elevation.

Referring now to the drawings in detail, and first to Figs. 1 and 2 thereof, it will be noted that the meter there shown includes a body of insulating material 1 of sheet form having an extension 2 provided at its end with an arcuate recess 3. Surrounding and supported by the extension 2 is a driving coil 4, the terminals thereof being connected to the terminal posts 5 and 6. The moving system of the meter comprises a rotary permanent magnet disc 7 carried by a shaft 8 which extends adjacent to one end of the coil 4 and at right angles to the axis of the coil.

The casing and mounting means of the meter may be of conventional construction and form no part of the invention. A calibrated scale 9 is provided in the usual manner and an indicating member such as the pointer 10 cooperates with the scale and is carried by the shaft 8 or is otherwise arranged for movement relative to the scale by rotation of the magnet disc 7. A conventional hairspring 11, or equivalent means, urges the disc 7, and thus the pointer 10, into an initial position. As shown, this initial position is such that the dipole axis of the disc 7 is displaced, in the plane of rotation of the disc, relative to the axis of the coil. Thus, energization of the magnet, by current such that terminal 6 is positive and terminal 5 negative, results in a torque upon the disc 7 which tends to rotate the disc to deflect the pointer 10 upscale. The initial position is the zero or non-deflected position of the meter and may be fixed by a stop 12 for the pointer.

In this type of moving magnet meter, the torque applied to the moving magnet by the driving coil is zero when the dipole axis of the magnet is aligned with the field of the coil, increases to a maximum when the dipole axis is deflected 90° relative to the coil field, and then decreases to zero again when the dipole axis is further deflected into alignment with the coil field. It would at first appear that the position of the magnet dipole at maximum torque would be at right angles to the coil axis. But, since the coil field is warped due to the presence of the magnet rotor, the axes of the coil and its field do not coincide, and the position of the dipole at true maximum torque is offset about 12° from the position obtained by rotating the magnet dipole 90° out of alignment with the coil axis. For purposes of simplicity hereinafter, and in the drawings, it is assumed that the position of maximum torque is attained by rotating the dipole 90° out of alignment with the coil axis.

As has been explained, the torque on the rotary magnet increases from zero to a maximum and then decreases to zero again when the magnet is rotated 180° relative to the deflecting coil. Only a portion of the 180° deflection is employed in operation of the meter. For example, the arc of deflection $\theta$ of the meter in use may be 80°, oriented so as to provide the position of maximum torque (assumed for convenience to be 90° deflection) as the midpoint of the scale. In such case, the initial position of the disc 7 is such, as seen in Fig. 1, that the dipole axis thereof is deflected 50° away from alignment with the axis of the coil 4. While such orientation is not required, it will be used for all of the illustrations herein.

In the embodiment shown in Fig. 1, a suppressing member consisting of a body 13 of magnetic material is secured to the insulating member 1 in substantial alignment with the axis of the coil 4. The suppressing member 13 may be either cemented to one face of the insulating member 1, as shown, or inset into the member 1 if the body thereof is so thick as to offset the suppressing member too greatly from the axis of the coil.

Figure 3:
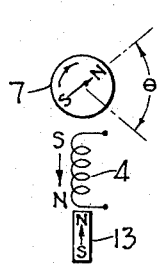
Fig. 3 is a diagram illustrating the magnetic relationships in the meter of Fig. 1 when the moving system thereof is in its initial, or zero, position.

The suppressing member 13 may be a permanent magnet arranged in magnetic opposition to the coil 4, so that the polarity relationship is as seen in Fig. 3. Thus, while the south pole generated by the coil 4 tends to repel the adjacent south pole of the disc magnet 7, the north pole of the suppressing member 13 acts in opposition to the coil field, tending to restrain the disc 7 against rotation. Therefore, there will be no upscale deflection of the pointer 10, Fig. 1, until the torque produced by the coil 4 exceeds that produced by the suppressing member 13. By proper choice of the suppressing torque, determined by the spacing of the member 13 relative to the disc 7, and by its strength, if it is a permanent magnet, the zero point of the meter—the point of initial upscale deflection—can be predetermined as desired.

Figure 4:
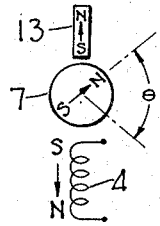
Figure 4:
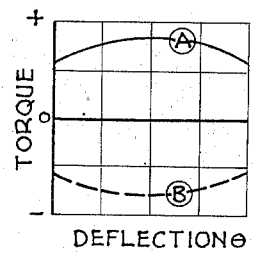

As seen in Fig. 3a, the suppressing member 13 can be placed diametrically opposite the coil 4, in which case the pole of the suppressing member adjacent the disc 7 is made a south pole, to attract the adjacent north pole of the magnet disc. Whether the magnetic relationships are as in Fig. 3 or as in Fig. 3a, the relation of deflecting torque to suppressing torque over the range of deflection of the meter is as shown in Fig. 4, where curve A represents the deflecting torque established by the coil 4 for a given current, and curve B the suppressing torque established by the member 13, both curves being sections of a sine curve and 180° out of phase.

Figure 5:
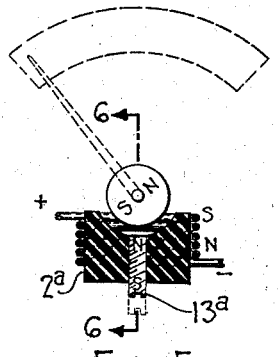
Fig. 5 is an elevational view of another meter structure embodying the invention, some parts being shown in vertical section.
Figure 6:
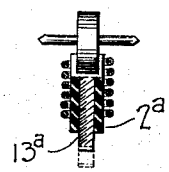
Fig. 6 is a sectional view taken on the line 6—6, Fig. 5, with some parts shown in elevation.

While the suppressing member 13 has been shown spaced from the coil in Fig. 1, this is not necessary. For example, as seen in Figs. 5 and 6, the suppressing member may be a screw 13a of magnetic material threaded into the form 2a of the driving coil. The screw 13a may be a permanent magnet arranged in magnetic opposition to the coil, as shown, or may be of ferromagnetic material. The arrangement of Figs. 5 and 6 allows easy initial adjustment of the meter for calibration, and also allows the suppressing member to be brought into close proximity to the magnet disc. The torque relationships are as shown in Fig. 4, and the operation of the meter is the same as described for that shown in Fig. 1.

I claim:

1. In an electric measuring instrument having a minimum reading in excess of zero, the combination of an arbor having a pointer and a permanently magnetized vane affixed thereto; a fixed hollow electrical coil disposed to one side of said magnetized vane with its axis at right angles to said arbor; a supporting element arranged crosswise of the hollow of said coil and having a tapped aperture coaxial with said coil; a suppressing element in the form of a screw of magnetic material engaged in the tapped aperture of said supporting element with capacity for adjustment toward and away from the periphery of said magnetized vane, said screw extending into the hollow of the coil into proximity with the periphery of the vane, and a coiled spring influential upon said arbor to position the pointer at the minimum reading when the total magnetic effect of said coil and said suppressing element on said vane is zero, one end of said coiled spring being connected to said arbor and the other end of said spring being fastened to a fixed point.

2. A measuring instrument constructed in accordance with claim 1 and wherein said suppressing element is a permanently magnetized screw arranged in magnetic opposition to said coil when the current flow in said coil is in a direction to cause an upscale deflection of said pointer.

3. In an electric measuring instrument having a minimum reading in excess of zero, the combination of an arbor having a pointer and a permanently magnetized vane affixed thereto, a fixed hollow electrical coil disposed to one side of said magnetized vane with its axis at right angles to said vane, a supporting element arranged transversely of said coil, a suppressing element in the form of an elongated body of magnetic material mounted on said supporting element with capacity for adjustment toward and away from the periphery of said magnetized vane, said suppressing element extending into the hollow of said coil into proximity with the periphery of said vane, and a coiled spring influential upon said arbor to position the pointer at the minimum reading when the total magnetic effect of said coil and said suppressing element on said vane is zero, one end of said coiled spring being connected to said arbor and the other end of said spring being fastened to a fixed point.

4. In an electric measuring instrument having a minimum reading in excess of zero, the combination of an arbor having a pointer and a permanently magnetized vane affixed thereto, a fixed hollow electrical coil disposed to one side of said permanently magnetized vane with its axis at right angles to said arbor, a supporting element arranged transversely of said coil, a suppressing element in the form of an elongated body of magnetic material, said suppressing element being mounted on said supporting element substantially in alignment with the axis of said coil, both said coil and said suppressing element magnetically influencing said vane when said coil is energized, and a coiled spring influential upon said arbor to position the pointer at the minimum reading when the total magnetic effect of said coil and said suppressing element on said vane is zero, one end of said coiled spring being connected to said arbor and the other end of said spring being fastened to a fixed point.

References Cited in the file of this patent

UNITED STATES PATENTS

| 408,157 | Barrett | July 30, 1889 |
| 497,448 | Hoyt | May 16, 1893 |
| 1,783,559 | Cone | Dec. 2, 1930 |
| 1,929,292 | St. Clair | Oct. 3, 1933 |
| 1,933,327 | Hoare | Oct. 31, 1933 |
| 2,102,409 | Faus | Dec. 14, 1937 |
| 2,178,108 | Schwarze | Oct. 31, 1939 |
| 2,181,960 | Bacon | Dec. 5, 1939 |
| 2,345,011 | Sias | Mar. 28, 1944 |
| 2,358,910 | De Giers | Sept. 26, 1944 |
| 2,603,730 | Pethes | July 15, 1952 |